(12) United States Patent
Biener et al.

(10) Patent No.: US 8,785,346 B2
(45) Date of Patent: Jul. 22, 2014

(54) METHOD FOR FORMING GOLD-CONTAINING CATALYST WITH POROUS STRUCTURE

(75) Inventors: Juergen Biener, San Leandro, CA (US); Alex V. Hamza, Livermore, CA (US); Marcus Baeumer, Bremen (DE); Christian Schulz, Bremen (DE); Birte Jürgens, Lilienthal (DE); Monika M. Biener, San Leandro, CA (US)

(73) Assignees: Lawrence Livermore National Security, LLC, Livermore, CA (US); Universitaet Bremen, Bremen (DE); Monika M. Biener, San Leandro, CA (US)

( * ) Notice: Subject to any disclaimer, the term of this patent is extended or adjusted under 35 U.S.C. 154(b) by 0 days.

(21) Appl. No.: 12/480,545

(22) Filed: Jun. 8, 2009

(65) Prior Publication Data

US 2009/0291848 A1    Nov. 26, 2009

Related U.S. Application Data (62) Division of application No. 11/728,939, filed on Mar. 26, 2007, now abandoned.

(30) Foreign Application Priority Data

Mar. 27, 2006  (DE) .................... 10 2006 014 067

(51) Int. Cl.
| | |
|---|---|
| *B01J 23/50* | (2006.01) |
| *B01J 23/52* | (2006.01) |
| *H01M 4/90* | (2006.01) |
| *H01M 4/98* | (2006.01) |
| *B01J 23/56* | (2006.01) |
| *B01J 25/00* | (2006.01) |
| *H01M 8/10* | (2006.01) |

(52) U.S. Cl.
CPC . *B01J 23/52* (2013.01); *B01J 23/56* (2013.01); *B01J 25/00* (2013.01); *H01M 4/90* (2013.01); *H01M 4/98* (2013.01); *H01M 2008/1095* (2013.01); *Y02E 60/50* (2013.01)
USPC ........... 502/347; 502/101; 502/102; 502/300; 502/325; 502/330; 423/210

(58) Field of Classification Search
CPC ............ B01J 23/52; B01J 23/56; B01J 25/00; H01M 4/90; H01M 4/98; H01M 2008/1095; Y02E 60/50
USPC .......... 148/512, 559, 678; 502/101, 102, 300, 502/325, 330; 423/210
See application file for complete search history.

(56) References Cited

U.S. PATENT DOCUMENTS

| | | | | |
|---|---|---|---|---|
| 2,071,216 | A * | 2/1937 | Powell et al. ................. | 148/405 |
| 3,427,153 | A * | 2/1969 | Yarish et al. .................. | 502/330 |
| 3,467,554 | A * | 9/1969 | Rissman et al. ............... | 429/42 |
| 4,126,934 | A * | 11/1978 | Richter et al. ............... | 29/623.1 |
| 4,219,509 | A | 8/1980 | Nielsen et al. | |
| 4,438,082 | A | 3/1984 | Dettling et al. | |
| 5,139,739 | A * | 8/1992 | Takayanagi et al. .......... | 420/507 |
| 6,046,239 | A | 4/2000 | Lennox et al. | |
| 6,805,972 | B2 * | 10/2004 | Erlebacher et al. ........... | 428/613 |
| 7,605,288 | B2 | 10/2009 | Blagg et al. | |
| 2003/0185736 | A1 | 10/2003 | Hatanaka et al. | |
| 2005/0096211 | A1 | 5/2005 | Takeda et al. | |
| 2006/0112785 | A1 * | 6/2006 | Garbar et al. ................... | 75/351 |
| 2007/0224099 | A1 | 9/2007 | Biener et al. | |
| 2008/0008639 | A1 * | 1/2008 | Sakurai et al. ................ | 423/230 |

FOREIGN PATENT DOCUMENTS

| | | | | |
|---|---|---|---|---|
| WO | 03/059507 A1 | 7/2003 | | |
| ZA | WO03059507 | * | 2/2003 | ............... B01J 23/52 |

OTHER PUBLICATIONS

Non-Final Office Action Summary from U.S. Appl. No. 11/728,393 dated Aug. 12, 2008.
Final Office Action Summary from U.S. Appl. No. 11/728,939 dated Mar. 11, 2009.

* cited by examiner

*Primary Examiner* — Jun Li
(74) *Attorney, Agent, or Firm* — Dominic M. Kotab (57) ABSTRACT

A method for forming a gold-containing catalyst with porous structure according to one embodiment of the present invention includes producing a starting alloy by melting together of gold and at least one less noble metal that is selected from the group consisting of silver, copper, rhodium, palladium, and platinum; and a dealloying step comprising at least partial removal of the less noble metal by dissolving the at least one less noble metal out of the starting alloy. Additional methods and products thereof are also presented.

16 Claims, 8 Drawing Sheets

Fig. 1

SEM images of the catalyst according to the invention at a) 1500x and b) 6000x enlargement

Fig. 2

XPS-Overview Spectrum

Fig. 3

$CO_2$ yields and temperature differences at different CO concentrations at +23 °C and a flow rate of 13.3 mL/min

Fig. 4

$CO_2$ yields and temperature differences at different CO concentrations at + 50 °C and a flow rate of 12.8 mL/min

Fig. 5

Comparison of yields at +50 °C and +23 °C

Fig. 6

$CO_2$ yields and temperature differences at different CO concentrations at 0 °C

Fig. 7

$CO_2$ yields (filled squares) and temperature differences (empty squares) at different CO concentrations at -20 °C

Fig. 8

Long-term stability of a catalyst according to the invention

US 8,785,346 B2

METHOD FOR FORMING GOLD-CONTAINING CATALYST WITH POROUS STRUCTURE

CROSS-REFERENCE TO RELATED APPLICATIONS

This application is a divisional of U.S. patent application Ser. No. 11/728,939, filed Mar. 26, 2007 now abandoned, and claims the priority benefit of German Patent Application No. DE 10 2006 014 067.2, filed Mar. 27, 2006 and titled "GOLD-CONTAINING CATALYST WITH POROUS STRUCTURE" all of which are incorporated herein by this reference.

The United States Government has rights in this invention pursuant to Contract No. W-7405-ENG-48 between the United States Department of Energy and the University of California for the operation of Lawrence Livermore National Laboratory.

FIELD OF INVENTION

The present invention relates to a gold-containing catalyst with porous structure, the use of the catalyst according to the invention to accelerate and/or influence the product selectivity of oxidation and reduction reactions, as well as a fuel cell with a catalyst according to the invention.

The action of catalysts is known to be based on the fact that they open a path to chemical reactions by which starting compounds or materials can be converted into end products by application of a small activation energy. However, catalysts not only accelerate a chemical reaction in this manner, but they can frequently also influence the objective of the reaction. Consequently, catalysts have immense significance in all fields in which an accelerated or targeted chemical conversion of educts is desirable or necessary.

Gold-based catalysts have been known for only a few years. They are suitable for both oxidation and reduction reactions, with the focus of the research and application fields certainly concentrating on the field of oxidation reactions. In this area, gold-containing catalysts are known, for example, for oxidation of ethylene and acetic acid to vinyl acetate or the partial or selective oxidation of hydrocarbons. However, the best-known application for gold-based catalysts has to be the oxidation of carbon monoxide to carbon dioxide. This reaction is often used not only as a model for investigation of the activity and properties of gold-based catalysts; such catalysts are among the few systems with which this reaction can already occur to an extent worth mentioning at room temperature.

In the area of reduction reactions, the use of gold-based catalysts has been described, for example, in the hydrogenation of carbon monoxide, carbon dioxide, and acetylene. Furthermore, gold catalysts in the form of supported gold particles have also been investigated with very positive results for applications in the reduction of nitrogen oxides as well as for hydrogenation reactions of alkenes or unsaturated aldehydes. (Masatake Haruta, CatTech, 2002, 6, 102415; Masatake Haruta, Cat, Today, 1997, 36, 153-166.)

It is further known that gold, as the most noble metal, can have a catalytic effect only under certain conditions. One of these conditions is, for example, that the gold must be present in very small (nano) particles. Such very small gold particles have, however, large surface energy and, consequently, tend to coagulate quickly, as a result of which their catalytic activity is greatly reduced.

For this reason, it has been proposed, to immobilize gold (particles) on a support material, in particular a transition metal oxide. A group of processes for the production of such catalytically active gold-containing systems are known that are directed at positively influencing the parameters important for catalytic systems, such as, for instance, selectivity, the reaction conditions (such as pressure and temperature) necessary for the progress of catalytic reactions, reaction speeds obtainable, as well as long-term stability, for example, through the use of new support materials or through the use of new processes for the production of gold and/or support material particles.

Thus, it has been proposed, for instance, in DE 4238640 A1 to produce the metal oxide with immobilized gold by means of mixed precipitation, wherein, however, part of the gold is located inactively in the interior of the resulting particles.

In order to circumvent this disadvantage, it has been proposed, repeatedly, to supply the gold to already existing porous support particles. Accordingly, WO 00/64581 teaches, for example, to first produce a particle of titanium-silicon mixed oxide using a sol-gel process; and then to deposit the gold on it using known processes, such as precipitation, impregnation, sputtering, chemical vapor deposition (CVD), or physical vapor deposition.

When gold is used in dissolved form (e.g., as $AuCl_3$) to deposit it, for example, by impregnation on the surface of support particles, as is proposed among other things in WO 03/106021, it is necessary to transform the gold cations into metallic form through an additional reduction reaction.

With wet chemical processes, problems related to reproducibility of the chemical/physical properties of the catalytic systems obtained are reported. These difficulties probably are based, for example, on the fact that, among other things, it is difficult to control the size of the gold particles, that the catalysts are poisoned by ions such as, for example, chloride, that different amounts of gold "get lost" in the pores of the support material, and that, through necessary thermal secondary processing steps, the catalytic activity of the material is altered in a non-reproducible manner.

For this reason, it is proposed, e.g., in WO 2005/03082 to deposit the gold by PVD on support material particles. A suitable vacuum apparatus is required for the PVD process, which makes the process expensive in terms of equipment and also imposes restrictions with regard to the size and shape of the support material used.

WO 03/059507 describes gold-containing catalytic materials that are produced by melting gold and a less noble metal together and then at least partially removing the less noble metal from the material obtained through chemical or electrochemical treatment. The metals of the groups IIB (Zn, Cd, Hg) and IIIA (B, Al, Ga, In, Tl) are proposed as less noble metals. It is further proposed to additionally provide a metal from one of the groups IVB, VB, VIB, VIII, IB, IIB, IIIA, IVA, as well as magnesium and cerium as a promoter. Also, in WO 03/059507 it is assumed that the finished catalyst has to have a support material based on a metal oxide since that is the only way to be able to prevent rapid agglomeration and sintering of the gold-containing material.

From this brief overview of known processes for the production of gold-containing catalysts, it is clear that, in each case, multiple complex and/or expensive steps are required before obtaining a gold-containing catalyst usable in practice.

Consequently, one object of the present invention is to provide a gold-containing catalyst with which the disadvantages known from the prior art are reduced. Another object of the present invention is to provide advantageous applications for the catalyst according to the invention.

SUMMARY OF THE INVENTION

These objects are accomplished through a gold-containing catalyst with porous structure, prepared by a method that includes the following steps: producing a starting alloy by melting together of gold and at least one less noble metal that is selected from the group consisting of silver, copper, rhodium, palladium, and platinum; and a dealloying step including at least partial removal of the less noble metal by dissolving the at least one less noble metal out of the starting alloy. It is desirable that the resulting gold-containing catalyst with porous structure contains no support structure for the gold.

The catalyst can be used advantageously in a process to accelerate and/or influence the product selectivity of oxidation and reduction reactions, and more particularly in a fuel cell.

The gold-containing catalyst with porous structure according to the invention is characterized in that it is obtainable through a process that comprises the following steps: melting together of gold and at least one less noble metal that is selected from the group consisting of silver, copper, rhodium, palladium, and platinum, and at least partial removal by dissolving the at least one less noble metal out of the starting alloy thus obtained. The preferred less noble metals for use in this invention include silver, copper and palladium, with silver being most preferred. The step of the at least partial dissolving out of the at least one less noble metal from the starting alloy is referred to hereinafter as a "dealloying process."

The catalyst according to the invention is surprisingly distinguished by high activity and great long-term stability, despite the fact that it does not contain a support material or a compound (e.g., a transition metal oxide) that serves as a support material. This is all the more surprising since all prior art assumed that such a support material is absolutely necessary in order to obtain adequate catalytic activity and stability of a gold-based catalyst.

DETAILED DESCRIPTION

The production of a gold-containing starting alloy is known to the person skilled in the art and may occur, for example, through simple mixing of the metals in a desired quantitative proportion and subsequent melting of the metals in a furnace, optionally in a protective gas atmosphere.

Starting alloys in which the ratio of gold to the less noble metal(s) is in the range from 50 atom %:50 atom % to 10 atom %:90 atom % are suitable for the catalyst according to the invention.

In the case of a gold-silver starting alloy (Au—Ag-starting alloy), the composition can be within the range from 20 to 45 atom %, i.e., at a ratio of gold to silver in the range from 45 atom %:55 atom % to 20 atom %:80 atom %. In the case of an Au—Ag-starting alloy, higher Au-concentrations result in the formation of a passivation layer and lower Au-concentrations do not yield a monolithic porous metal body. The possible concentration limits for each alloy type for all the metals disclosed herein can be readily determined by a person skilled in the art. For the measurements of catalytic activity described below, an Au—Ag-starting alloy with 30 atom % Au was used.

Within the respective possible concentration limits, additional optimization may be undertaken. What is considered optimal in each individual case may differ; accordingly, for example, optimization may have as its goal the highest possible activity, the longest possible service life, or even the least possible cost.

After the production of the starting alloy, it is advantageous to homogenize the starting alloy. This is achieved by holding the starting alloy for an adequate time at a temperature just below the melting point.

One of the particular advantages of the catalyst according to the invention is that its production starts from a starting alloy. The starting alloy obtained can be given almost any shape before the dealloying process, and, thus, virtually any desired shape can be obtained. The external shape of the starting alloy is not altered by the dealloying process described below, such that the shape of the later catalyst can already be predefined through the shaping of the starting alloy.

Any suitable process can be used for the shaping of the starting alloy, such as, pressing, stamping, rolling, bending, boring, hammering, cutting, and/or milling. Since these methods are usually not particularly expensive from a technical standpoint (for example, no vacuum chamber is required), virtually any desired size and shape of the catalyst can be produced simply and cost-effectively.

The shaped starting alloy is preferably annealed before the dealloying process in order to reduce mechanical stresses, for 24 hours at 850° C., for example.

The starting alloy may, however, for example, also be given a desired shape or an advantageous shape for additional processing or shaping using a casting process. If the shaping of the catalyst according to invention occurs exclusively by means of a casting process, the starting alloy obtained is advantageously merely homogenized.

The at least partial dealloying and creation of the porous structure then occurs in a next step preferably through the use of at least one electrochemical and/or wet-chemical process. Which process or which combination of different processes is the most suitable in each case depends, among other things, on the composition of the alloy and/or the intended use of the resultant catalyst. The most suitable process or the most suitable combination can be determined by a person skilled in the art through a few experiments.

With the use of an electrochemical process, the partial or complete dealloying of the less noble metal out of the starting alloy and the extent of the dealloying (i.e., how much of the less noble metal is still found or remains in the starting alloy) can be very precisely controlled by adjusting the voltage or current density of the electrical process.

For example, the silver portion can be dissolved out of the Au—Ag-starting alloys to the extent desired by fixing the specimens using a gold plated clamp and placing them, for example, in a solution with 1 M $HNO_3$ and 0.01 M $AgNO_3$. The solution described is appropriate for a silver pseudo-reference electrode, but must not be used for silver/silver chloride reference electrodes. In the latter case, there would be a risk of contamination of the solution with chloride ions. In order to free the starting alloy of silver, voltage above the critical potential is applied. The dealloying process is terminated when the electrical current drops into the range of a few microamperes. Then, the specimen is usually washed several times with water and then dried in air. The residual proportion of the at least one less noble metal can be controlled by the total current conducted or the conditions at the end of the electrolysis.

An at least partial dealloying occurs through the use of a wet-chemical process using a solution with a composition such that it causes dissolution of the less noble metal out of the starting alloy. The composition of the solution is guided by the requirement of being able to dissolve the less noble metal(s) but without significantly attacking the gold in the starting alloy.

One example of such a solution for the at least partial dealloying of an Au—Ag-starting alloy with 30 atom % gold consists in a solution of 70% nitric acid. With such a solution, it is possible, for example, to (partially) dealloy 300 μm thick specimens within one to three days at room temperature. At least the majority of the silver portion is selectively dissolved out of specimens by nitric acid, and nanoporous gold foams remain. The acid is removed by washing the specimens several times with water; then, the specimens can be dried in air.

The proportion of the less noble metal(s) can be expediently reduced to the desired remainder through process control during the dealloying process, with this remainder being as low as a proportion of O atom %.

The material has, after partial or complete dealloying, a ratio of gold to the at least one less noble metal in the range from 100 atom %: 0 atom % to roughly 95 atom %:5 atom %. These data are based on results of analyses using atom absorption spectroscopy (AAS), with which the entire composition of the material can be determined.

Analyses using XPS (XPS=X-ray photoelectron spectroscopy) yielded ratios of gold to the at least one less noble metal in the same materials in the range from roughly 100 atom %:0 atom % to roughly 80 atom %:20 atom %. To the extent the values determined using XPS indicated a higher proportion for the at least one less noble metal, this is based on the fact that XPS is a highly surface sensitive measurement method. It is well known to the individuals skilled in the art that in alloys one or more metals may be enriched on the surface relative to the interior.

The optimum proportion of the less noble metal that should remain in the porous gold-containing catalyst for the respective desired purpose may be determined simply by an individual skilled in the art by experiment. As already explained above with regard to the mix ratio of the metals for the stating alloy, there is also the possibility with regard to the residual metal content of the less noble metal that the question as to what is considered optimum can be answered differently for each applicational case; here again, optimization may, for example, have as its goal the highest possible activity, the longest possible service life, an optimum degree of porosity, or even the least possible cost.

In order for the catalyst according to the invention to develop its full catalytic activity, it is activated advantageously by a moderately elevated temperature (e.g., in the range from roughly +40 to +80° C.) in an oxygen-containing atmosphere, which optionally contains a certain proportion of CO. Usually, a one-time activation of this type suffices. A presence of carbon monoxide is advantageous since it is possible to track the course of activation through it (after successful activation, oxidation of carbon monoxide to carbon dioxide is detectable or increased). To date, no more detailed information is available concerning the mechanism of activation.

One possible explanation for this activation may be that water which is found in the pores of the foam is removed by the elevated temperature. It may also be possible that organic compounds such as hydrocarbons that block the surface are likewise removed by the elevated temperature. It is also conceivable that a segregation of metals to the surface takes place under the conditions selected for activation.

As investigations have shown, advantageous embodiments of the catalyst according to the invention have a pore structure with diameters of roughly 30 to 100 nm (determined with scanning electron microscopy) and a surface in the range of 2 to 8 m$^2$/g determined with the BET process.

The plastic properties of the starting alloy make it possible, advantageously, that the alloy can even be shaped in a thin or very thin film, and this thin or very thin film can then be dealloyed at least partially by one of the above described processes.

After the dealloying process, a porous membrane-type structure with a thickness of as little as 100 nm is available, through which a medium, for example, a gas or a gas mixture or a liquid may be guided. In order to obtain the greatest possible reactions or yields, the catalyst according to the invention may be installed, for example, in the form of a framed or frameless membrane-type structure (membrane catalyst) at right angles to the direction of flow of a medium.

As the inventors discovered, the catalyst according to the invention has, for example, an excellent capability to oxidize carbon monoxide (CO) to carbon dioxide ($CO_2$) and to do this at temperatures of a carbon monoxide-containing medium, for example, a gas, a gas mixture, or a liquid, as low as about −50° C. The examples described in the following concern tests in which this oxidation was successfully performed in the range from roughly −20° C., through 0° C. and room temperature (+23° C.) all the way up to +50° C. Of course, it is to be expected that this oxidation reaction is accelerated by even higher temperatures, for example, up to approximately 150° C., using the catalyst according to the invention. In particular, catalytically mediated oxidation at low temperatures seems to be especially interesting since, with it, energy and, consequently, cost can be saved.

The property of efficient oxidation of carbon monoxide to carbon dioxide also makes the catalyst according to the invention interesting for application in fuel cells. In particular, with polymer electrolyte membrane fuel cells (PEM), carbon monoxide can block the anode catalyst. If a catalyst according to the invention, e.g., in the form of a framed or frameless membrane catalyst, or even in the form of a conventional catalyst charge is arranged upstream relative to the anode catalyst in the gas stream, disadvantageously acting carbon monoxide can be removed for the most part, in any case, from the gas stream by this catalyst before it is sent on to the anode catalyst.

As already mentioned above, the catalyst according to the invention may also be produced in the form of a particulate catalyst, for example, in powder form, and then be used, for instance, in the form of a catalyst charge or as a finely distributed catalyst in a reaction mixture.

For the production of the catalyst according to the invention in particle and powder form, the material can be crushed after the dealloying process through the use of an appropriate process. This is comparatively simple because the material has a clearly higher brittleness after the at least partial dealloying than the starting alloy. In the crushing process, care must be taken to avoid pressure loads or to keep them as small as possible since a high pressure load could have a disadvantageous effect through compacting or destruction of the pores.

Alternatively, according to the invention, the starting alloy may also be produced in small particles, e.g., by dripping a corresponding melt into a cool or cooling medium. It is likewise possible to produce small particles from a solid starting alloy by mechanical processing. The small particles of the starting alloy can then be at least partially dealloyed as described and developed into a catalyst according to the invention.

The catalyst particles or powder thus obtained can then, of course, be again formed, for example, into larger units, such as pellets, for example, and used as such.

A method for forming a gold-containing catalyst with porous structure according to one embodiment of the present invention includes producing a starting alloy by melting together of gold and at least one less noble metal that is selected from the group consisting of silver, copper, rhodium, palladium, and platinum; and a dealloying step comprising at least partial removal of the less noble metal by dissolving the at least one less noble metal out of the starting alloy.

The present invention is described more precisely through the following statements. These statements are based on tests and results that have been performed or determined using the catalyst according to the invention for oxidation of carbon monoxide to carbon dioxide. The oxidation of common monoxide to carbon dioxide represents, however, only one of the many possible areas of application for the catalyst according to the invention and is thus to be understood merely as one suitable model system for the presentation of properties of the catalyst according to the invention. The statements thus serve merely to illustrate properties of the catalyst according to invention and must not be understood such that they are in any way restrictive for the range of protection of the following claims. Moreover, the data in this document concerning the composition of the catalyst according to the invention are to be understood such that in the gold used and in the at least one less noble metal, the usually present impurities may, of course, still be present.

EXAMPLES

1. Presentation of Exemplary Gold Foams

Figure 1:
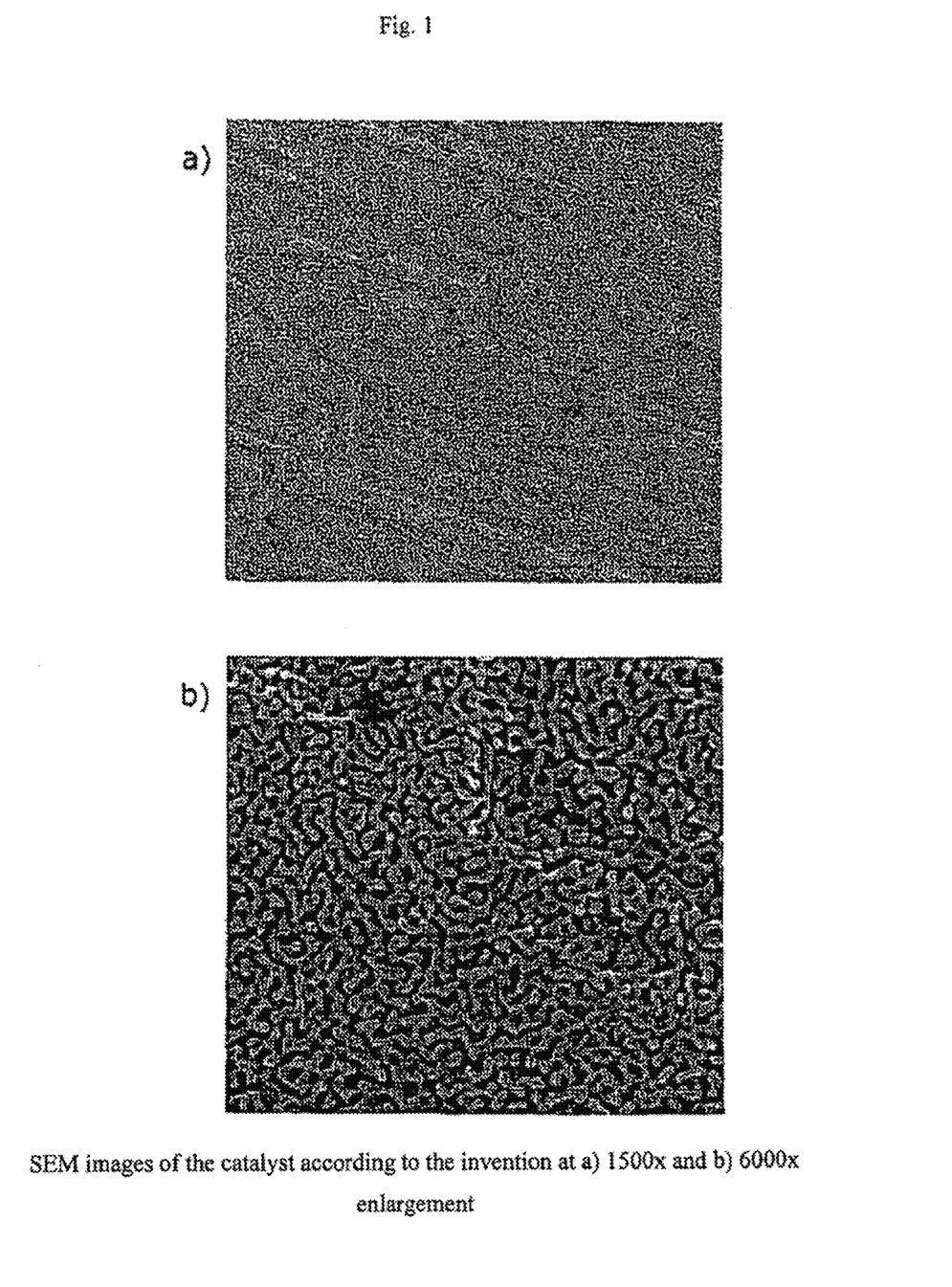
FIG. 1 Scanning electron microscope images of the porous structure according to the invention at a) 1500× and b) 6000× enlargement.

First, an Au—Ag-starting alloy with 30 atom % Au was produced. The finished starting alloy was rolled to roughly 5 mm diameter into small pieces of desired thickness. Then, the specimens were annealed for 24 hours at 850° C. For the partial dealloying and creation of the foam structure, the specimen underwent wet-chemical treatment. The wet chemical partial dealloying was carried out in a solution of 70% nitric acid. The specimens were placed on a porous glass plate in a beaker. Then, the acid was added such that the specimen was covered. Roughly 300-μm-thick specimens were dealloyed in this manner within from one to three days. The greater part of the silver portion was selectively dissolved out of the specimens by the nitric acid, and nanoporous gold foams remained. The acid was removed using a syringe and replaced with water. This was changed out several times in order to clean remaining acid residues from the specimens. The specimens were then air dried. The specimens have the foam structure shown in FIG. 1.

2. Surface Analysis Using XPS

XPS-analyses were performed in a UHV apparatus from the company Omicron. The specimens were placed on a specimen plate and transferred into the apparatus. The x-ray source used is a magnesium anode from the company Omicron. Detection took place through an energy spectrometer EA 10+ from the company SPECS/Leybold. The energy of the photons in these measurements was 1253.6 eV. In all measurements, except those in the overview spectrum presented in FIG. 2, the pass energy was 25 eV. For the overview spectrum, it was 100 eV.

3. Composition of an Exemplary Catalyst

In order to determine the composition, measurements were performed on the one hand using atom absorption spectroscopy (AAS, from the company Zeiss). For this, the specimens were dissolved in aqua regia and then investigated for their silver and gold content. On the other hand, the surface composition was determined using x-ray photoelectron spectroscopy (XPS). This process is surface sensitive and detects only the upper atomic layer of the material. An exemplary XPS overview spectrum is presented in FIG. 2.

Figure 2:
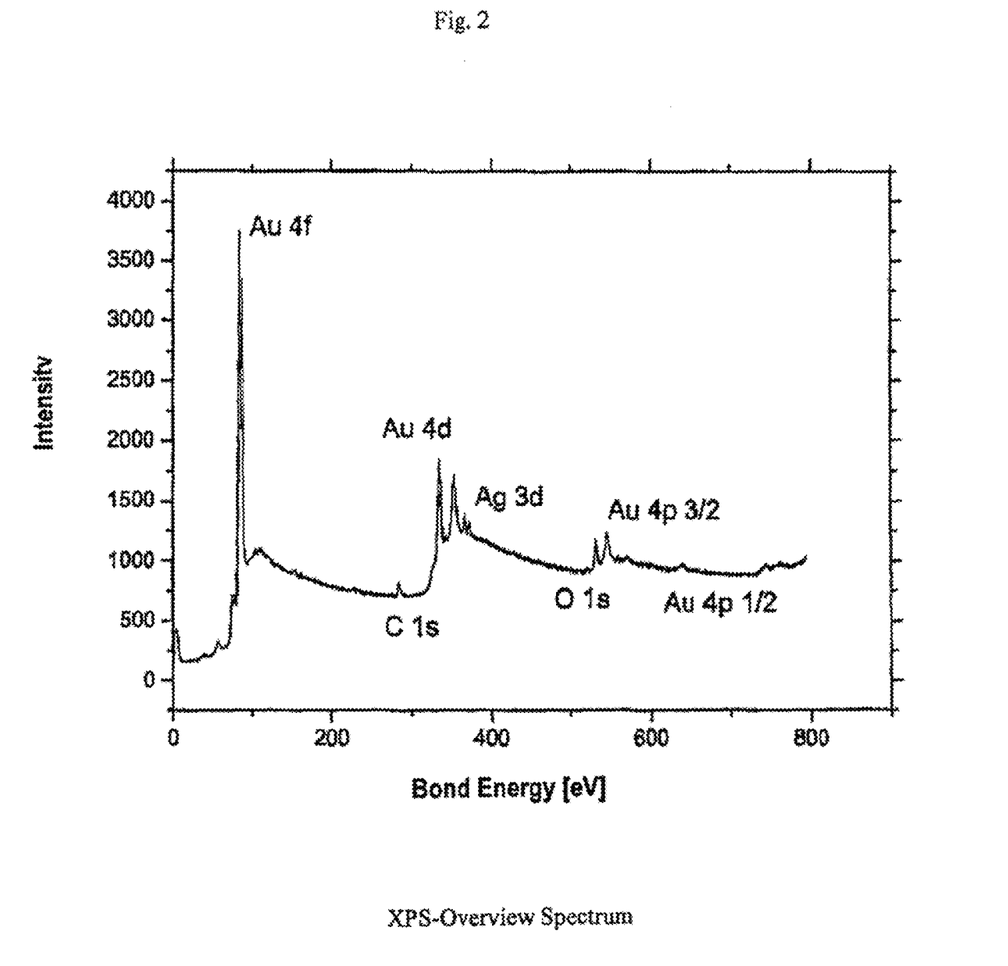
FIG. 2 an XPS-overview spectrum of a gold foam according to the invention.

From the spectrum presented in FIG. 2, it is possible to conclude that the gold is present in metallic, not in ionic form. The peaks at 87.75 eV and 84.1 eV can be associated with the 4f-state of metallic gold, which according to the literature should be at 87.45 eV and 83.8 eV [L. E. Davis, G. E. Muilenberg, C. D. Wagner, W. M. Riggs; *Handbook X-Ray Photoelectron Spectroscopy*, Perkin-Elmer Corporation 1978].

Two additional peaks can be identified in the spectrum at 373.05 eV and 367.06 eV. These two peaks can be associated with the 3d-state of metallic silver. The surface composition can be quantitatively determined through the integral intensities of the gold and silver peaks—taking into account the different effective cross-sections.

Using the ratios of the integral signal intensities of silver and gold, a silver content of 4-5 atom % was determined. It was assumed that the silver is distributed homogeneously in the areas near the surface detected with the method. In contrast, using AAS, a residual silver content of approx. 0.5 atom % was determined. This points to an enrichment of the silver on the surface. \

4. Reactor Setup for the Measurements of Carbon Monoxide Oxidation

The reactor consists of a glass cylinder with a fritte (diameter 2 cm), on which the specimen (diameter 5 mm) rests. The gas is supplied via a glass tube that surrounds the cylinder in a spiral formation to control the temperature of the gas. (It should be noted that with the reactor setup described, depending on flow conditions, not all gas molecules can interact with the specimen. The gas flow rate is regulated by two flow volume regulators from the company Brockhorst. The regulators have a maximum flow rate of 50 mL/min synthetic air and 5.6 mL/min carbon monoxide. The deviations of the flow volume regulators from the set flow equal ±2%. The flow volume regulators are calibrated using the bubble counter method.

Temperature control is indirect via a silicon bath in which the reactor is located and which can be temperature controlled from −20° C. to +200° C. by thermostat from the company Haak. In the interior of the reactor, there is a nickel/chromium-nickel and a nickel/chromium-nickel-nickel/chromium element. The reactor temperature is measured by the Ni/Cr—Ni-element, whereas the Ni/Cr—Ni—Ni/Cr-element is arranged such that one node contacts the specimen and the other hangs above it. By means of this arrangement, it is possible to measure the temperature difference between the specimen and the reactor. The error of such a thermal element is 1% of the temperature difference measured.

A $CO_2$ Uras 3G from the company Hartmann and Braun, with which the amount of carbon dioxide is measured by volume, is connected. The carbon dioxide concentration in volume and the temperature difference are output as a voltage signal and plotted by a chart recorder LS-52-2 of the company Linseis. The Uras 3G is calibrated by setting different concentrations of carbon monoxide in synthetic air and then detecting them using the Uras 3G. The maximum operating range of the device is 8 volume percent carbon dioxide with an instrument error of 0.5%.

5. Catalysis Using an Exemplary Catalyst at +23° C.

The following statements refer by way of example to a catalyst according to the invention in the form of a gold foam that was produced from an Au—Ag-starting alloy (30 atom % Au) using a wet-chemical process. This material has a pore structure with diameters of approx. 50 nm determined using scanning electron microscopy. The surface determined with the BET-process was approx. 4 m²/g. The residual silver content was, in the entire material of the catalyst, as described, a few atom percent (0.5-2%), with silver enriched on the surface (4-20 atom %).

Figure 3:
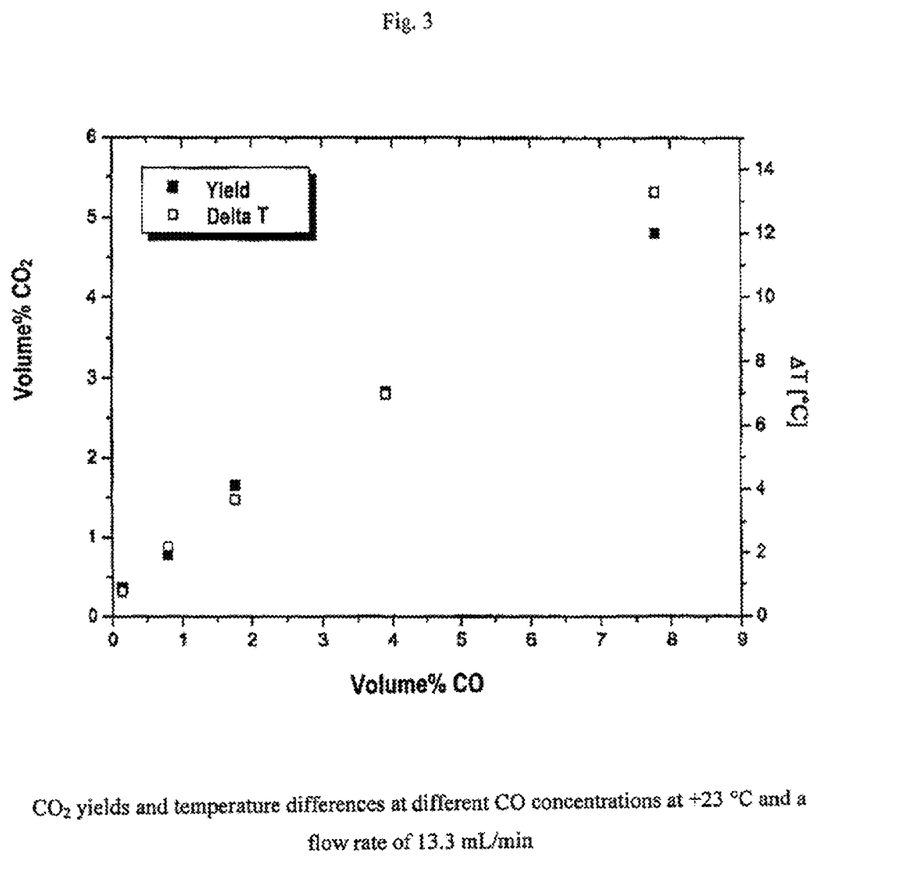
FIG. 3 $CO_2$ yields and temperature differences with different CO concentrations at +23° C. and a flow rate of 13.3 mL/min.

After a one-time activation of the catalyst at +50° C. in a gas stream of 50 mL/min of synthetic air, that contained 4 volume % carbon monoxide, the reaction of the carbon monoxide could be continued at room temperature. For this, 13 mL/min of synthetic air flowed through the test reactor, in which the specimen lying on a ceramic fritte was exposed to the gas stream. Carbon monoxide was mixed at different concentrations in the gas stream. In the range from 0.14 to 7.8 volume %, constantly increasing carbon dioxide yields could be observed. The product gases were detected using a carbon-dioxide-specific gas detector (Uras 3G from the company Hartmann & Braun). In addition, it was possible to determine the temperature difference ($\Delta T$) between the reactor and the catalyst specimen using the thermal coupler. Since the reaction investigated ($CO + 1/2 O_2 \rightarrow CO_2$) is an exothermic reaction, the reaction could be detected by an elevated temperature of the specimen compared to the reactor. FIG. 3 depicts both the carbon dioxide yields in volume % and the positive temperature differences. Both results clearly indicate the oxidation of carbon monoxide with the catalyst used. The temperature used at the time of the tests was +23° C.

6. Catalysis Using an Exemplary Catalyst at +50° C.

Figure 4:
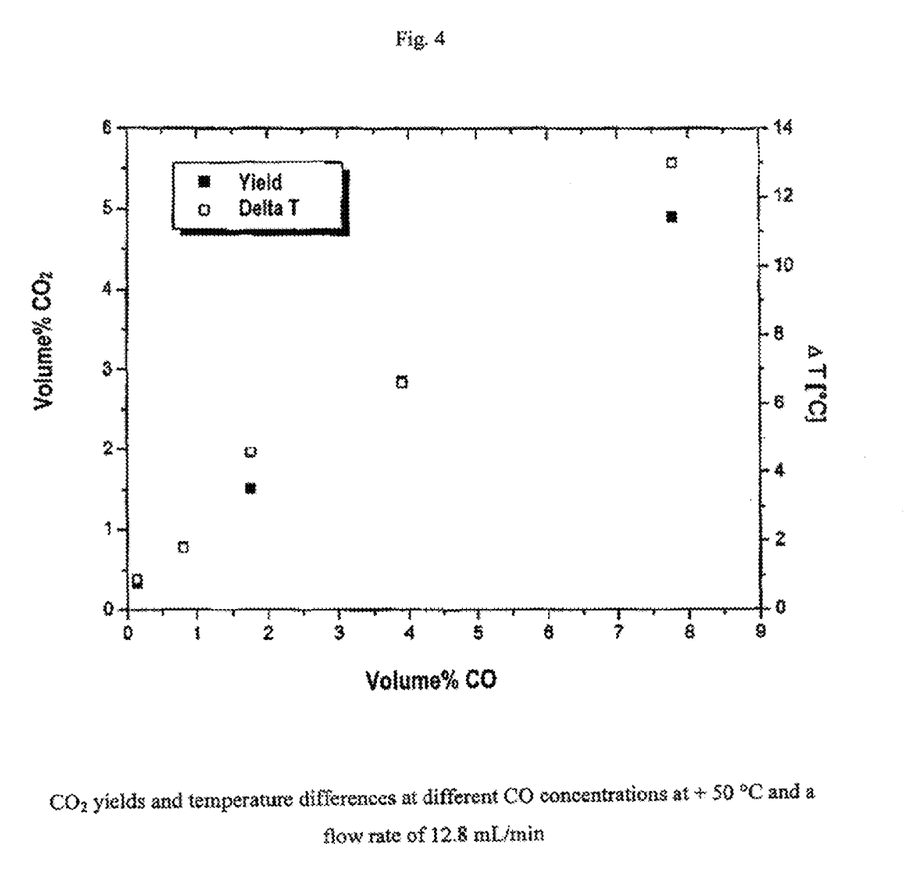
FIG. 4 $CO_2$ yields and temperature differences with different CO concentrations at +50° C. and a flow rate of 12.8 mL/min.
Figure 5:
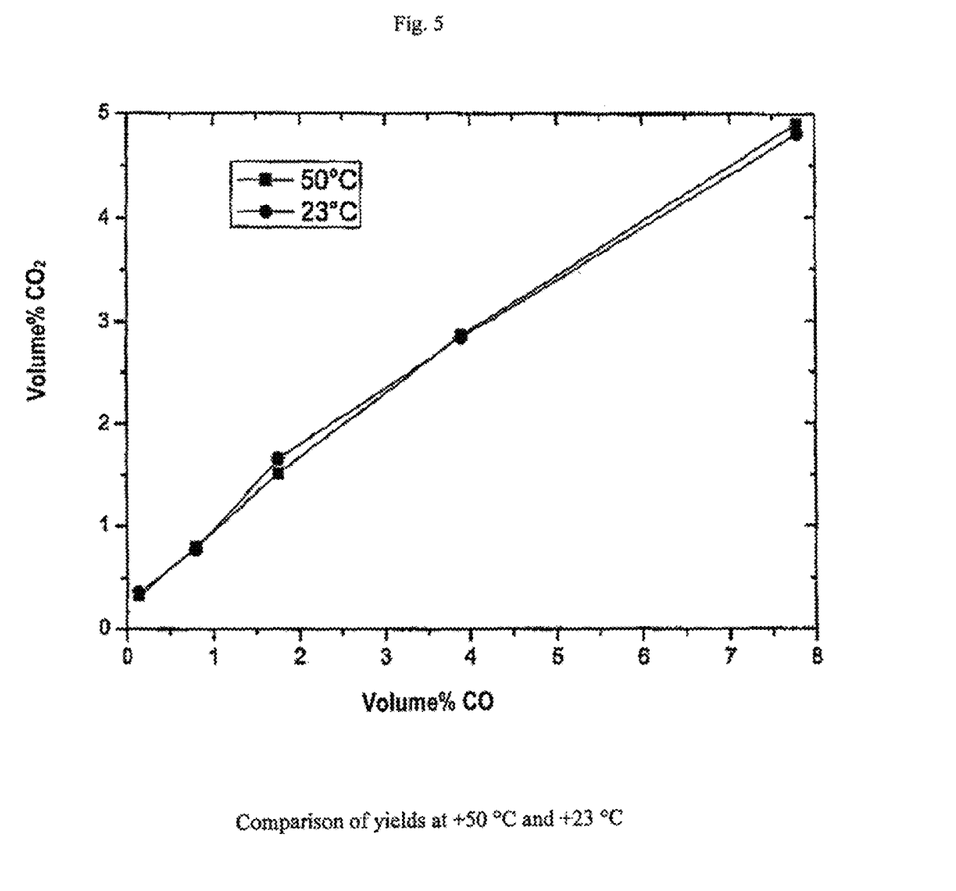
FIG. 5 a comparison of the yields at +50° C. and +23° C.

When one performs the same test that was described above under 5 at a temperature of +50° C., one obtains results that are very similar to those of the test at +23° C., as can be seen in FIG. 4. Again, the yield of carbon dioxide increases virtually linearly with increasing carbon monoxide concentration, and the temperature differences correlate with the yields. In FIG. 5, the yields from the measurements at +23° C. and +50° C. are presented in a graph.

7. Catalysis Using an Exemplary Catalyst at 0° C.

Figure 6:
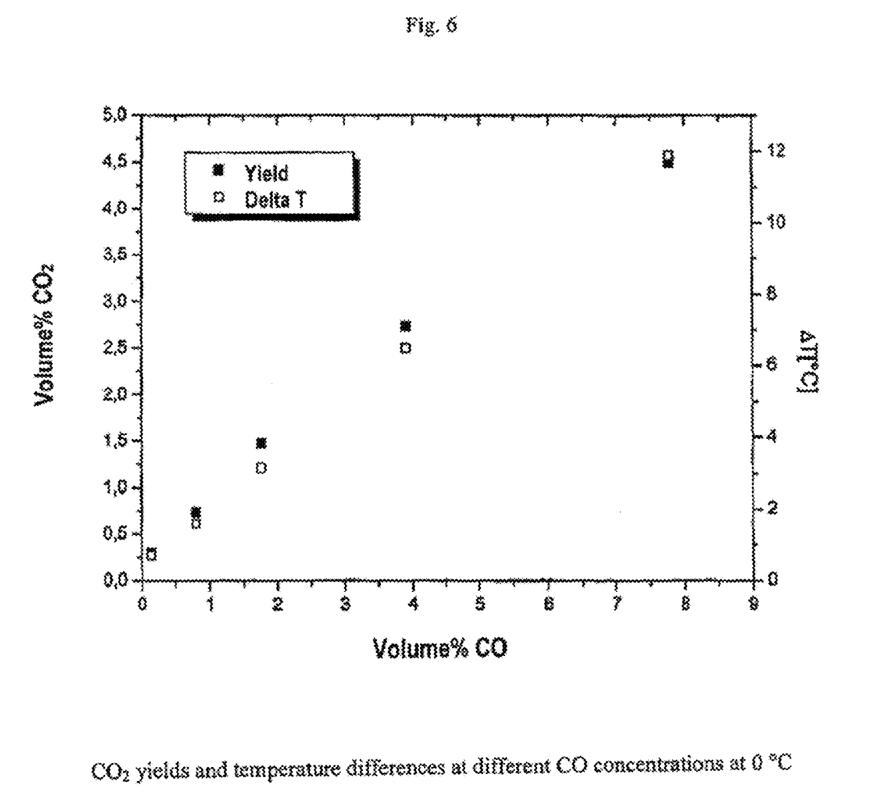
FIG. 6 $CO_2$ yields and temperature differences with different CO concentrations at 0° C.

In the case of measurements at 0° C. the same behavior of the catalyst according to the invention is observed as with measurements at higher temperatures. As presented in FIG. 6, both the highest yield of 4.5 volume % of carbon dioxide was measured at the highest concentration of carbon monoxide and the lowest yield of 0.3 volume % was measured at the lowest carbon monoxide concentration.

8. Catalysis Using an Exemplary Catalyst at −20° C.

Figure 7:
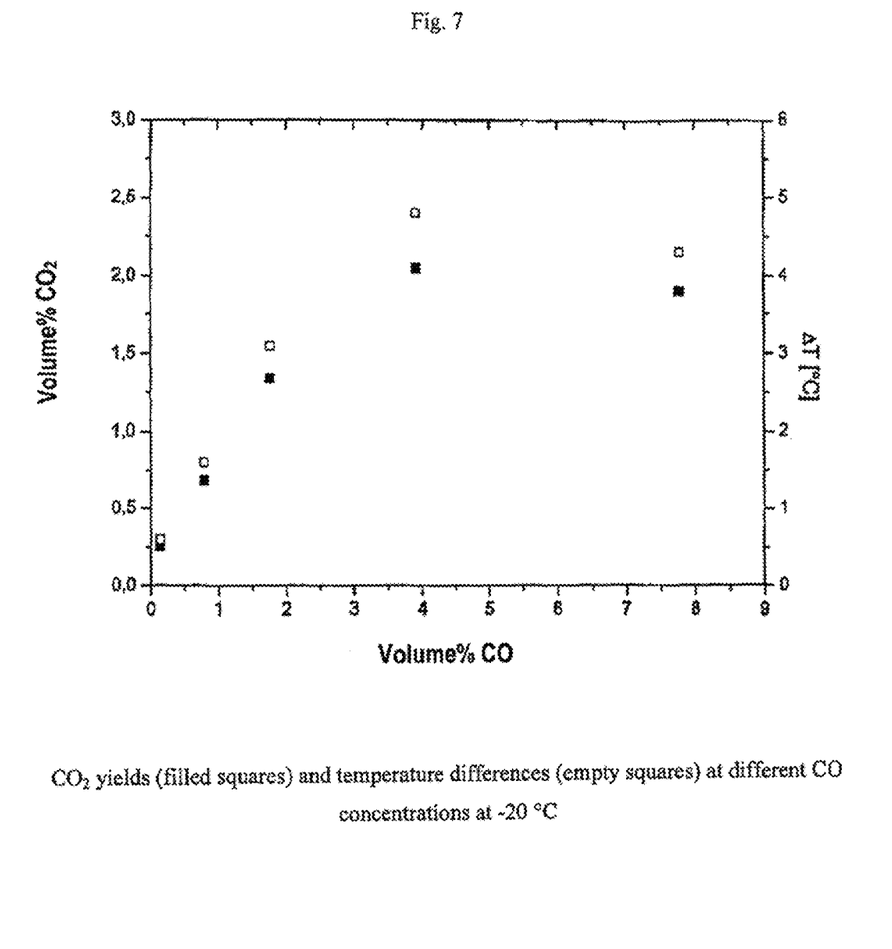
FIG. 7: $CO_2$ yields and temperature differences with different CO concentrations at −20° C.

The carbon dioxide yields at −20° C. are lower than all those mentioned at higher temperatures, as shown in FIG. 7. However, the fact that such a high conversion is even obtained at such a low temperature is unexpected and surprising and clear evidence of the qualities of the catalyst according to the invention.

When the yields from the measurements −20° C. are considered, they no longer reflect the typical course of the curve that was observed with all previous measurements. In contrast to the measurements at higher temperatures, the increase is no longer linear. Although an increase in the yield of carbon dioxide formed was always measured with the measurements at higher temperatures with increasing carbon monoxide concentration, this appears to no longer be the case above 4 volume % of carbon monoxide at −20° C.

Apparently, at a lower temperature such as −20° C. the concentration of carbon monoxide is not the deciding factor for the reaction speed, but a different factor is acting in a limiting manner.

Without intending to establish a specific explanation, it might be that the dissociation of the molecular oxygen under the conditions acts on the kinetics of the reaction to determine the speed.

9. Long-Term Stability

A specimen with a weight of 29.1 mg and a residual silver content of 0.5 atom % in the interior and approx. 16 atom % on the surface was first placed in the reactor at room temperature (ca. +20° C.) and rinsed with synthetic air. After a few minutes, 4 volume % of carbon monoxide (CO) was mixed with the gas. The entire volume flow of the gas was 50 mL/min. Under these conditions, the catalyst was, as anticipated, inactive. After raising the temperature to +50° C., the activity of the specimen started immediately and even continued to increase in the following hours. The temperature of +50° C. was maintained during the further course of the experiment. The curve of the activity is shown in FIG. 8.

Figure 8:
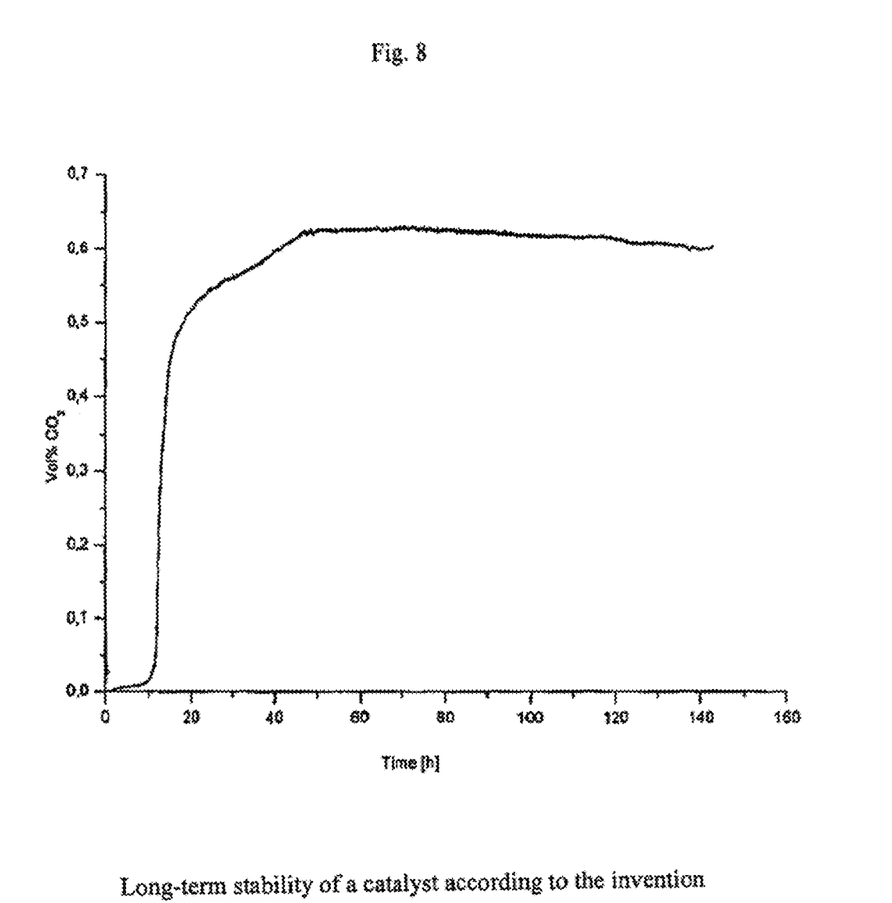
FIG. 8: long-term stability of a catalyst according to the invention

FIG. 8 shows the activity of the specimen as a function of time. However, it must be considered that the catalyst used here (in a reactor on laboratory scale) was a very small specimen with a weight of only about 29 mg. Consequently, it must be assumed that a large part of the reaction gas flowed past the catalyst surface and could not participate in the reaction. The values presented here must, consequently, be considered relative and not absolute units.

The invention provides a new gold-containing catalyst with porous structure that, with a comparatively simple method for its production, is distinguished by an outstanding suitability for catalytic acceleration and/or catalytic influence on the product selectivity of oxidation and reduction reactions and also has adequate to outstanding long-term stability despite the absence of support material. These characteristics make the catalyst according to the invention particularly suited, for example, for the oxidation and, consequently, the removal of carbon monoxide from a medium, such as a gas, a gas mixture, or a liquid.

The invention claimed is:

1. A method for forming a gold-containing catalyst with porous structure, the method comprising:
producing a starting alloy by melting together gold and at least one less noble metal that is selected from the group consisting of silver, copper, rhodium, palladium, and platinum, wherein a ratio of gold to the less noble metal(s) in the starting alloy is in the range from 45 atom %:55 atom % to 10 atom %:90 atom %;
homogenizing the starting alloy, wherein the starting alloy is held for a period of time at a temperature just below the melting point of the starting alloy;
annealing the starting alloy at a temperature of about 850° C.;
dealloying the starting alloy to form a porous structure, wherein the dealloying comprises at least partial removal of the at least one less noble metal by dissolving the at least one less noble metal out of the starting alloy; and
activating the porous structure after the dealloying at a temperature of 40 to 80° C. in a gaseous atmosphere containing oxygen and carbon monoxide,
wherein after the dealloying the ratio of gold to the at least one less noble metal in the porous structure is in the range from 100 atom %:0 atom % to about 95 atom %:5 atom %, determined using AAS,
wherein after the dealloying the porous structure does not contain a support material.

2. The method of claim 1, comprising a ratio of gold to the less noble metal(s) in the starting alloy is in the range from 20 atom %:80 atom % to 45 atom %:55 atom %.

3. The method of claim 1, comprising an Au—Ag starting alloy, the ratio of gold to silver in the starting alloy is within the range from 45 atom %:55 atom % to 20 atom %:80 atom %.

4. The method of claim 1, wherein the porous structure after the dealloying is in particulate form in a nanometer range.

5. The method of claim 1, further comprising at least one shaping step with which the starting alloy is given a desired shape.

6. The method of claim 1, wherein the starling alloy consists of the gold and he at least one less noble metal.

7. The method of claim 1, wherein the dealloying step and the creation of the porous structure occur with the use of at least one wet-chemical and/or one electrochemical process.

8. The method of claim 1, wherein after the dealloying, the porous structure is in a membrane form having a thickness of about 100 nm.

9. The method of claim 1, wherein a pore structure of the catalyst after the dealloying has diameters of roughly 30 to 100 nm and has a surface area in the range of 2 to 8 m²/g.

10. The method of claim 4, further comprising forming one or more pellets, wherein each of the one or more pellets comprises a plurality of the porous structure particulates.

11. The method of claim 1, wherein after the dealloying the porous structure consists of gold and the at least one less noble metal, where the at least one less noble metal is present in an amount from 0 atom % to about 3 atom % as determined using AAS.

12. The method of claim 1, wherein the dealloying step and the creation of the porous structure occur with the use of an acidic solution comprising 70% nitric acid.

13. A method for forming a gold-containing catalyst with porous structure, the method comprising:
producing a starting alloy by melting together gold and at least one less noble metal that is selected from the group consisting of silver, copper, rhodium, palladium, and platinum, wherein the starting alloy consists essentially of the gold and the at least one less noble metal, wherein the ratio of gold to the less noble metal(s) in the starting alloy is in the range from 45 atom %:55 atom % to 10 atom %:90 atom %;
shaping the starting alloy into a desired shape;
annealing the shaped starting alloy after all shaping is completed;
dealloying the shaped starting alloy to form a porous structure, wherein the dealloying comprises at least partially removing the at least one less noble metal by dissolving at least some of the at least one less noble metal out of the starting alloy, wherein the ratio of gold to the at least one less noble metal in the porous structure is in the range from 100 atom %:0 atom % to 95 atom %:5 atom %, determined using AAS, wherein the porous structure after the dealloying does not contain a support material; and
activating the porous structure at a temperature of 40° C. to 80° C. in a gaseous atmosphere comprising oxygen and carbon monoxide.

14. The method of claim 13, wherein the porous structure after the dealloying has pores with diameters of 30 to 100 nm and a surface area in the range of 2 to 8 m²/g.

15. A method for forming a gold-containing catalyst with porous structure, the method comprising:
producing a starting alloy that consists of gold and at least one less noble metal that is selected from the group consisting of silver, copper, rhodium, palladium, and platinum, wherein a ratio of gold to the less noble metal(s) in the starting alloy is in the range from 45 atom %:55 atom % to 10 atom %:90 atom %, wherein producing the starting alloy comprises melting together the gold and the at least one less noble metal;
annealing the starting alloy;
dealloying the starting alloy to form a dealloyed porous structure, wherein the dealloying comprises at least partially removing the at least one less noble metal by dissolving at least some of the at least one less noble metal out of the starting alloy, wherein the dealloyed porous structure consists of gold and the at least one less noble metal having a ratio of gold to the at least one less noble metal in a range from 100 atom %:0 atom % to 95 atom %:5 atom %, determined using AAS, wherein the dealloyed porous structure does not contain a support material, wherein the dealloyed porous structure has pores with diameters between about 30 to 100 nm and a surface area in the range of 2 to 4 m²/g;
activating the dealloyed porous structure at a temperature of between about 40° C. in a gaseous atmosphere containing oxygen and carbon monoxide,
wherein the activated dealloyed porous structure and crushing the activated dealloyed porous structure.

16. The method of claim 15, wherein the process also comprises at least one shaping step with which the starting alloy is given a desired shape, wherein the shaping of the starting alloy includes at least one of the shaping methods of pressing, stamping, rolling, bending, boring, and cutting; and annealing the starting alloy after the shaping and before the dealloying by annealing the shaped starting alloy for about 24 hours at a temperature of 850° C.

* * * * *